(12) United States Patent
Glejbol

(10) Patent No.: US 9,796,148 B2
(45) Date of Patent: Oct. 24, 2017

(54) METHOD OF PRODUCING AN UNBONDED FLEXIBLE PIPE

(71) Applicant: National Oilwell Varco Denmark I/S, Brondby (DK)

(72) Inventor: Kristian Glejbol, Glostrup (DK)

(73) Assignee: NATIONAL OILWELL VARCO DENMARK I/S, Brondby (DK)

(*) Notice: Subject to any disclaimer, the term of this patent is extended or adjusted under 35 U.S.C. 154(b) by 353 days.

(21) Appl. No.: 14/391,445

(22) PCT Filed: Apr. 9, 2013

(86) PCT No.: PCT/DK2013/050096
§ 371 (c)(1),
(2) Date: Oct. 9, 2014

(87) PCT Pub. No.: WO2013/152770
PCT Pub. Date: Oct. 17, 2013

(65) Prior Publication Data
US 2015/0060589 A1 Mar. 5, 2015

(30) Foreign Application Priority Data
Apr. 12, 2012 (DK) .................................. 2012 00259

(51) Int. Cl.
*F16L 11/16* (2006.01)
*B29D 23/00* (2006.01)
*F16L 11/08* (2006.01)

(52) U.S. Cl.
CPC .......... *B29D 23/001* (2013.01); *F16L 11/083* (2013.01); *F16L 11/16* (2013.01); *Y10T 29/49885* (2015.01)

(58) Field of Classification Search
CPC .......... F16L 9/165; F16L 11/083; F16L 11/16; Y10T 29/49885
(Continued)

(56) References Cited

U.S. PATENT DOCUMENTS 3,311,133 A 3/1967 Kinander
3,687,169 A 8/1972 Reynard
(Continued)

FOREIGN PATENT DOCUMENTS

FR 2 782 141 A1 2/2000
GB 1 404 394 A 8/1975
(Continued)

OTHER PUBLICATIONS

Supplementary European Search Report issued in Patent Application No. EP 13 77 5640 dated Nov. 2, 2015.
(Continued)

*Primary Examiner* — Jermie Cozart
(74) *Attorney, Agent, or Firm* — Pearne & Gordon LLP

(57) ABSTRACT

The invention relates to a method of producing an unbonded flexible pipe and an unbonded flexible pipe. The method comprises providing an innermost sealing sheath defining a bore and a longitudinal axis, and a pressure armor layer surrounding the innermost sealing sheath. The pressure armor layer comprises at least one helically wound elongate armor element with at least one helical armor element gap between windings thereof, and the method comprises providing a foundation layer for the pressure armor layer. The foundation layer is provided with at least one helically shaped groove, and the elongate armor element is applied in the helically shaped groove, preferably such that the foundation layer at least partly fills the helical armor element gap, the foundation layer is preferably a fluid permeable foundation layer.

23 Claims, 13 Drawing Sheets

(58) Field of Classification Search
USPC .................................................. 138/134, 135
See application file for complete search history.

(56) References Cited

U.S. PATENT DOCUMENTS

| | | | |
|---|---|---|---|
| 3,858,616 A | 1/1975 | Thiery et al. | |
| 3,866,632 A | 2/1975 | Schaffer | |
| 4,549,581 A | 10/1985 | Unno et al. | |
| 4,706,713 A | 11/1987 | Sadamitsu et al. | |
| 5,213,637 A | 5/1993 | Mallen Herrero et al. | |
| 5,407,744 A | 4/1995 | Mallen Herrero et al. | |
| 5,601,893 A | 2/1997 | Strassel et al. | |
| 5,645,109 A | 7/1997 | Herrero et al. | |
| 5,669,420 A | 9/1997 | Herrero et al. | |
| 5,730,188 A | 3/1998 | Kalman et al. | |
| 5,813,439 A | 9/1998 | Herrero et al. | |
| 5,837,083 A | 11/1998 | Booth | |
| 5,922,149 A | 7/1999 | Mallen Herrero et al. | |
| 5,996,641 A | 12/1999 | Chen | |
| 6,016,847 A | 1/2000 | Jung et al. | |
| 6,065,501 A | 5/2000 | Feret et al. | |
| 6,085,799 A | 7/2000 | Kodaissi et al. | |
| 6,123,114 A | 9/2000 | Seguin et al. | |
| 6,145,546 A | 11/2000 | Hardy et al. | |
| 6,165,586 A | 12/2000 | Nouveau et al. | |
| 6,192,941 B1 | 2/2001 | Mallen-Herrero et al. | |
| 6,253,793 B1 | 7/2001 | Dupoiron et al. | |
| 6,283,161 B1 | 9/2001 | Feret et al. | |
| 6,291,079 B1 | 9/2001 | Mallen Herrero et al. | |
| 6,354,333 B1 | 3/2002 | Dupoiron | |
| 6,382,681 B1 | 5/2002 | Berton et al. | |
| 6,390,141 B1 | 5/2002 | Fisher et al. | |
| 6,408,891 B1 | 6/2002 | Jung et al. | |
| 6,415,825 B1 | 7/2002 | Dupoiron et al. | |
| 6,454,897 B1 | 9/2002 | Morand | |
| 6,516,833 B1 | 2/2003 | Witz et al. | |
| 6,668,867 B2 | 12/2003 | Espinasse et al. | |
| 6,691,743 B2 | 2/2004 | Espinasse | |
| 6,739,355 B2 | 5/2004 | Glejbøl et al. | |
| 6,840,286 B2 | 1/2005 | Espinasse et al. | |
| 6,889,717 B2 | 5/2005 | Coutarel et al. | |
| 6,889,718 B2 | 5/2005 | Glejbøl et al. | |
| 6,904,939 B2 | 6/2005 | Jung et al. | |
| 6,978,806 B2 | 12/2005 | Glejbol et al. | |
| 6,981,526 B2 | 1/2006 | Glejbol et al. | |
| 7,032,623 B2 | 4/2006 | Averbuch et al. | |
| 7,311,123 B2 | 12/2007 | Espinasse et al. | |
| 7,487,803 B2 | 2/2009 | Lokere et al. | |
| 7,842,149 B2 | 11/2010 | Glejbøl et al. | |
| 2003/0102044 A1 | 6/2003 | Coutarel et al. | |
| 2011/0030831 A1 | 2/2011 | Clements et al. | |
| 2011/0209889 A1 | 9/2011 | Carlson | |
| 2011/0226374 A1 | 9/2011 | Kalman | |
| 2011/0240164 A1 | 10/2011 | Hudson | |

FOREIGN PATENT DOCUMENTS

| | | |
|---|---|---|
| WO | 01/51839 A1 | 7/2001 |
| WO | 01/61232 A1 | 8/2001 |
| WO | 2008/025893 A1 | 3/2008 |
| WO | 2008/077409 A1 | 7/2008 |
| WO | 2008/077410 A1 | 7/2008 |
| WO | 2009/024156 A2 | 2/2009 |
| WO | 2011/083819 A1 | 7/2011 |

OTHER PUBLICATIONS

"Recommended Practice for Flexible Pipe"; ANSI/API Recommended Practice 17B, Fourth Edition; Jul. 2008; pp. 1-213.
"Specification for Unbonded Flexible Pipe"; ANSI/API Specification 17J, Third Edition; Jul. 2008; pp. 1-73.

METHOD OF PRODUCING AN UNBONDED FLEXIBLE PIPE

TECHNICAL FIELD

The invention relates to a method of producing an unbonded flexible pipe as well as an unbonded flexible pipe in particular for offshore and subsea transportation of fluids like hydrocarbons, CO2, water and mixtures hereof/or for an umbilical.

BACKGROUND ART

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an inner liner also often called an inner sealing sheath or an inner sheath, which forms a barrier against the outflow of the fluid which is conveyed in the bore of the pipe, and one or more armoring layers. In general flexible pipes are expected to have a lifetime of 20 years in operation.

Examples of unbonded flexible pipes are e.g. disclosed in WO0161232A1, U.S. Pat. No. 6,123,114 and U.S. Pat. No. 6,085,799.

The term "unbonded" means in this text that at least two of the layers including the armoring layers and polymer layers are not bonded to each other. In practice the known pipe normally comprises at least two armoring layers located outside the innermost sealing sheath and optionally an armor structure located inside the innermost sealing sheath normally referred to as a carcass.

These armoring layers comprise or consist of multiple elongated armoring elements that are not bonded to each other directly or indirectly via other layers along the pipe. Thereby the pipe becomes bendable and sufficiently flexible to roll up for transportation.

For many applications a pipe of the above type will need to fulfill a number of requirements. First of all the pipe should have a high mechanical strength to withstand the enormous forces it will be subjected to during transportation, deployment and operation. The internal pressure (from inside of the pipe and outwards) and the external pressure (from outside of the pipe) are usually very high and may vary considerably along the length of the pipeline, particular when applied at varying water depths. If the internal pressure of the pipe exceeds the load bearing capacity of the armoring elements of the armoring layers located outside the innermost sealing sheath, the internal pressure will ultimately result in damage of the pipe e.g. by upheaval buckling and/or burst of the flexible pipe. Unbonded flexible pipes which are to be deployed at deep water and/or which are to be subjected to high internal pressures therefore often comprise a pressure armor which is a layer of helically wound armor elements, wound on the outer side of the innermost sealing sheath and with a relative steep angle to the longitudinal center axis of the pipe e.g. of about 70 degrees or higher. In order to ensure that the windings of the helically wound armor elements of the pressure armor are do not separate to much from each other during deployment and during use under high internal pressure, the windings of the helically wound armor elements of the pressure armor layer are usually interlocked to each other since an increased and uncontrolled gap between windings of the helically wound armor elements provides an increased risk of damage to the sealing sheath and burst of the flexible pipe.

Such unbonded flexible pipes with interlocked pressure armors are for example described in U.S. Pat. No. 6,065,501 and US 2011/0030831.

The interlocking of the helically wound armor elements of the pressure armor layer is, however, rather cumbersome and expensive and further results in limitation of possible types of armor elements that can be applied.

DISCLOSURE OF INVENTION

An object of the present invention is to provide a method of producing an unbonded flexible pipe with an innermost sealing sheath and a pressure armor comprising helically wound armor element(s) and with a high resistance against undesired creep of the innermost sealing sheath into gaps of helical windings of the armor elements.

An additional object of the invention is to provide an unbonded flexible pipe with an innermost sealing sheath and a pressure armor comprising helically wound armor element(s) and with a high resistance against creep of the innermost sealing sheath into gaps of helical windings of the armor elements and wherein the windings of the armor element(s) of the pressure armor layer need not be interlocked.

These objects have been achieved by the present invention as defined in the claims and described herein below.

The method of the invention comprises providing an innermost sealing sheath for the unbonded flexible pipe defining a bore and a longitudinal axis, and a pressure armor layer surrounding the innermost sealing sheath. The pressure armor comprises at least one helically wound elongate armor element with helical armor element gaps between windings thereof. In an embodiment of the invention, the armor layer comprises one single helically wound elongate armor element. In an embodiment of the invention, the armor layer comprises two or more helically wound elongate armor elements. In order to have a relatively high winding angle to the longitudinal axis of the pipe it is often desired to keep the number of helically wound elongate armor elements relatively low e.g. to 1, 2, 3 or 4 helically wound elongate armor elements.

The method further comprises providing a foundation layer for the pressure armor layer. The foundation layer is provided with at least one helically shaped groove, and the method comprises providing that the elongate armor element is applied in the helically shaped groove. The elongate armor element is applied in the helically shaped groove preferably such that the foundation layer at least partly fills the helical armor element gap.

The foundation layer has the function of supporting the helically wound armor element(s). According to the invention it has been found that due to the foundation layer, a high resistance against undesired creep of the innermost sealing sheath into gaps of helical windings of the armor element(s) has been achieved and simultaneously the windings of the armor element(s) of the pressure armor layer need not be interlocked.

It has also been found that the flexible unbonded pipe can retain a high flexibility while simultaneously comprising the beneficial foundation layer.

Additionally it has been found that the helically wound armor element(s) are to a high degree protected against wear.

It is important that the foundation layer is separate and not integrated with the innermost sealing sheath.

In a preferred embodiment of the invention, the foundation layer is a fluid permeable foundation layer. Thereby risk of forming gas pockets between the foundation layer and the innermost sealing sheath is reduced or even avoided.

In the following the term "elongate armor element" also includes the plural version thereof unless otherwise specified. In an embodiment the pressure armor layer comprises one single helically wound elongate armor element. In an embodiment the pressure armor layer comprises two or more helically wound elongate armor elements.

In a preferred embodiment of the invention, the elongate armor element is a non-interlocked elongate armor element.

It should be understood that the elongate armor element could be interlocked without being excluded from the invention.

"Non-interlocked elongate armor element" means herein that the helically wound elongate armor element is not interlocked to it self or to an adjacent elongate armor element in respective adjacent windings thereof.

All sizes, angles and direction are determined when the unbonded flexible pipe is in an unloaded and straight condition unless other is specifically mentioned.

In an embodiment of the invention, the method comprises helically winding the at least one elongate armor element followed by applying the foundation layer such that the elongate armor element is applied in the helically shaped groove.

In an embodiment of the invention the elongate armor element is fully applied in the helically shaped groove, meaning that the windings of the elongate armor element are fully contained in the helically shaped groove and no part(s) of the elongate armor element windings protrudes above the helically shaped groove.

In an embodiment of the invention the elongate armor element is not fully applied in the helically shaped groove, meaning that the windings of the elongate armor element at is partly contained in the helically shaped groove and that a part or parts of the elongate armor element windings protrudes above (meaning that it protrudes in radial direction above) the helically shaped groove.

In an embodiment where the helical winding of the at least one elongate armor element is performed prior to applying the foundation layer, the method comprises applying the foundation layer directly onto the at least one helically wound elongate armor element.

The foundation layer can be applied by any method such as by winding or by being applied in panel sections e.g. such as described below.

In an embodiment where the helical winding of the at least one elongate armor element is performed prior to applying the foundation layer, the method comprises applying an anti-wear layer onto the at least one helically wound elongate armor and/or between the at least one helically wound elongate armor element prior to applying the foundation layer. The anti-wear layer has the function of reducing wear and simultaneously it has been found that the anti-wear adds to obtaining a high flexibility of the unbonded flexible pipe.

The anti-wear layer may be any kind of anti-wear layers e.g. in the form of a wound layer of woven PA or such as it is generally known in the art e.g. as described in "Recommended Practice for Flexible Pipe", ANSI/API 17 B, fourth Edition, July 2008, and in "Specification for Unbonded Flexible Pipe", ANSI/API 17J, Third edition, July 2008. An anti-wear layer is usually and preferably liquid permeable.

In an embodiment where the helical winding of the at least one elongate armor element is performed prior to applying the foundation layer, the method comprises applying at least one distance element in the helical armor element gap prior to applying the foundation layer. The distance element(s) can in principle have any size or shape to provide the desired distance. In a preferred embodiment the distance element or elements comprise one or more elongate elements with a cross-sectional width of from about 50% to about 100% of the average width of the helical armor element gap.

The width is determined in the cross-section of the elongate element or helical armor element gap and in a direction perpendicular to the winding direction of the elongate armor element.

The distance element can have any cross sectional shape, such as round or angular e.g. rectangular, square, triangular, pentagonal etc.

The distance element is preferably of polymer, in particular an elastomer.

In an embodiment where the helical winding of the at least one elongate armor element is performed prior to applying the foundation layer, the method comprises applying an anti-wear layer prior to the helical winding of the elongate armor element(s). By applying an anti-wear layer between the elongate armor element and the innermost sealing sheath the risk of formation of local gas pockets between the innermost sealing sheath and the elongate armor element is reduced and simultaneously the anti-wear layer adds to high flexibility of the pipe. The anti-wear layer also protects the innermost sealing sheath. The anti-wear layer is e.g. as described above.

In a preferred embodiment of the invention, the method comprises applying the foundation layer followed by helically winding the at least one elongate armor element, such that the elongate armor element is applied in the helically shaped groove.

By applying the foundation layer prior to the helical winding of the elongate armor element a simpler and less costly production is achieved because the winding of the elongate armor element is simpler to control and the risk of undesired displacement of wound parts of the elongate armor element is reduced or even avoided.

In a preferred embodiment of the invention, the elongate armor element(s) is helically wound directly onto the foundation layer, the elongate armor element(s) is applied in the helically shaped groove of the foundation layer, and thereby the distance (gap) between windings of the elongate armor element is controlled.

In an embodiment of the invention, an anti-wear layer is applied onto the foundation layer prior to applying the elongate armor element(s). As mentioned above the anti-wear layer has the function of reducing wear and simultaneously it has been found that the anti-wear adds to obtaining a high flexibility of the unbonded flexible pipe. The anti-wear is e.g. as described above.

In an embodiment of the invention, the method comprises applying a holding layer onto the elongate armor element(s). The holding layer is for example in the form of at least one helically wound elongate holding element. The elongate holding element preferably has a cross-sectional shape with a width and a substantially perpendicular flange which flange is applied in the helically armor element gap.

The holding layer provides an additional control of gaps between windings of the elongate armor element and the holding layer is in particular useful in pipes which are subjected to high loads and/or to repeating bendings such as pipes for use as risers. The holding layer needs not be applied in the whole length of the pipe. In an embodiment of the invention, the holding layer is applied in sections only, such as sections of the pipe where it is subjected to high loadings and repeating bends, e.g. near end fittings and/or bend limiters. The holding layer may in itself function as a bend limiter in such sections.

Preferably the width of the elongate holding element(s) is/are at least about the width of the elongate armor element(s).

In an embodiment of the invention, the width of the elongate holding element(s) is such that upon the helical winding thereof the windings of the elongate holding element(s) are in contact with adjacent windings thereof.

In an embodiment of the invention, the width of the elongate holding element(s) is such that upon the helical winding thereof the windings of the elongate holding element(s) form a helical holding element gap between windings thereof. The helical holding element gap is preferably less than the helical armor element gap, more preferably the helical holding element gap is at least about 10%, such as at least about 20% less, such as at least about 40% less than the helical armor element gap.

The elongate holding element can have any cross sectional shape, such as T-shaped, L-shaped or Π-shaped.

The elongate holding element is preferably of polymer.

The elongate holding element is preferably non-interlocked.

In an embodiment windings of the elongate holding element is interlocked by an interlocking U formed metal strip where the two 'legs' of the U are engaged with respective e.g. adjacent windings of the elongate holding element.

As indicated above all gaps are determined when the unbonded flexible pipe is in an unloaded and straight condition.

In a preferred embodiment of the invention, the holding layer is in the form of an additional foundation layer. The additional foundation layer may for example be substantially identical to the first applied foundation layer.

The term "substantially" should herein be taken to mean that ordinary product variances and tolerances are comprised.

The holding layer in the form of an additional foundation layer may be any foundation layer as described herein, independently of the first applied foundation layer. However, for a simple construction it is preferred in an embodiment that the additional foundation layer is substantially identical to the first applied foundation layer.

In an embodiment of the invention, the method comprises applying an anti-wear layer prior to applying the foundation layer.

The foundation is preferably a polymer layer, which optionally may be reinforced.

In an embodiment of the invention, the foundation layer is a polymer layer with a tensile strength which is less than the tensile strength of the elongate armor element(s) in its/their elongate direction. Thereby the stress and load applied to the pipe will mainly be concentrated in the elongate armor element.

Tensile strength is determined as the ultimative tensile strength UTS. UTS is the maximum resistance to fracture. It is equivalent to the maximum load that can be carried by one square inch of cross-sectional area when the load is applied as simple tension. The UTS is for example found by performing a tensile test and recording the stress versus strain; the highest point of the stress-strain curve is the UTS. The UTS is preferably performed at 25° C.

In an embodiment of the invention, the foundation layer is of polymer optionally comprising reinforcing fibres. The foundation layer preferably comprises or consists of polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibers, such as steel-fibers, glass-fibers, basalt-fibers, pp-fibers, carbon-fibers and/or aramide fibers.

The term "cut fibers" means herein fibers of a non continuous length, e.g. in the form of chopped fibers or melt blown fibers. The cut fibers are usually relatively short fibers e.g. less than about 5 cm, such as from about 1 mm to about 3 cm in length. The cut fibers may have equal or different lengths.

Filaments are continuous single fiber (also called monofilament).

The phrase "continuous" as used herein in connection with fibers, filaments, strands or rovings means that the fibers, filaments, strands, yarns, or rovings generally have a significant length but should not be understood to mean that the length is perpetual or infinite. Continuous fibers, such as continuous filaments, strands, yarns, or rovings preferably have a length of at least about 10 m, preferably at least about 100 m, more preferably at least about 1000 m.

The term "strand" is used to designate an untwisted bundle of filaments.

The term "yarn" is used to designate a twisted bundle of filaments and/or cut fibers. Yarn includes threads and ropes. The yarn may be a primary yarn made directly from filaments and/or cut fibers or a secondary yarn made from yarns and/or cords. Secondary yarns are also referred to as cords.

The term "roving" is used to designate an untwisted bundle of strands or yarns. A roving includes a strand of more than two filaments. A non twisted bundle of more than two filaments is accordingly both a strand and a roving.

In an embodiment of the invention, the foundation layer comprises reinforcement fibers. The reinforcement fibres are preferably cut fibers, such as cut polypropylene fibers, cut aramide fibres and/or cut basalt fibres.

The cut fibres are preferably compounded into the polymer prior to extruding or moulding.

In an embodiment of the method of the invention, the foundation layer is an extruded layer. The helically shaped groove can in a simple manner be provided during the extrusion process by providing a rotating extrusion head. Where the foundation layer is provided by extrusion is should be considered to keep the foundation layer relatively thin or to select a material with relatively high elastomeric properties in order to maintain a high flexibility of the pipe. In an embodiment of the invention where the foundation layer is provided by extrusion the minimum thickness of the foundation layer determined in the groove is preferably less than the thickness of the innermost sealing sheath.

In an embodiment of the invention, the thickness of the foundation layer varies along the length of the pipe determined along its longitudinal axis. Thereby the flexibility of the pipe can be adjusted to a desired level e.g. such that one length section of the unbonded flexible pipe has a higher flexibility than another e.g. adjacent length section of the pipe In an embodiment of the invention, the foundation layer is a wound layer. The foundation layer is preferably provided by winding at least one elongate foundation element. The elongate foundation element(s) is preferably pre-shaped such that upon winding thereof, the elongate foundation element(s) form(s) the foundation layer with the at least one helically shaped groove.

In an embodiment windings of the elongate foundation element layer is interlocked by an interlocking U formed metal strip where the two 'legs' of the U are engaged with respective e.g. adjacent windings thereof. In an embodiment the elongate foundation element has a slit along its length on the side opposite to the side comprising at least one helically shaped groove. The legs of the U formed metal strip are engaged with adjacent windings of the elongate foundation element by being inserted into said slit. The metal strip will thereby form a barrier against gasses penetrating from the bore of the pipe and through the innermost sealing sheath.

The elongate foundation element(s) is/are preferably produced by extrusion.

The elongate foundation element(s) preferably has/have a cross-sectional width which is larger than the cross-sectional width of the elongate armor element(s). In an embodiment of the invention, the elongate foundation element(s) has/have a cross-sectional width which is at least about twice the width of the elongate armor element(s), such as at least 3 times the width of the elongate armor element(s).

The elongate foundation element(s) can be produced with one or more grooves. In an embodiment of the invention, the elongate foundation element(s) comprises at least one groove which upon the helical winding of the elongate foundation element(s) constitutes the helically shaped groove(s)

The elongate foundation element(s) can be wound with a distance between windings or with a slight overlap, however, in a preferred embodiment of the invention, the elongate foundation element(s) is/are helically wound in an edge-to-edge configuration optionally hold in position by a interlocking elements such as a U shaped strip as described above. Thereby the foundation layer for the elongate armor element provides a very good foundation and a stable regulation of distance between windings of the elongate armor element.

In an embodiment of the invention, the elongate foundation element(s) is/are helically wound with a gap referred to as an elongate foundation element gap.

In this embodiment it is preferred that the elongate foundation element gap is less than the helical armor element gap in order to ensure a stable regulation of distance between windings of the elongate armor element. Preferably the elongate foundation element gap is at least about 10%, such as at least about 20% less, such as at least about 40% less than the helical armor element gap.

All gaps are determined when the pipe is in a straight and unloaded condition unless other is specified.

In an embodiment of the invention, the foundation layer is applied in panel sections. The panel sections are applied to provide a complete foundation layer preferably with no or only minor gaps.

In an embodiment of the invention, the panel sections are applied such that they are in contact with adjacent panel sections. In an embodiment of the invention, the panel sections are applied such that they are in contact with distance elements adjusting gaps between adjacent panel sections.

Each panel section preferably has a length along the longitudinal axis which is at least about 10 cm, such as at least about 15 cm, preferably the panel section has a length along the longitudinal axis of from about 20 cm to about 5 m, such as from about 0.5 m to about 2 m.

In an embodiment of the invention, each panel section surrounds at least about $\frac{1}{8}^{th}$ of the innermost sealing sheath, such as at least about $\frac{1}{4}^{th}$ of the innermost sealing sheath, such as at least about half of the innermost sealing sheath, such as about the whole innermost sealing sheath.

In an embodiment of the invention, the panel sections are interlocked with each other e.g. via interlocking elements applied between adjacent panel sections, which interlocking elements may additionally provide distance elements as described above.

In an embodiment of the invention, the panel sections are not interlocked with each other. In an embodiment, the panel section is applied immediately prior to helical winding of the elongate armor element and the panel sections are held in position by the elongate armor element windings.

The foundation layer and the elongate armor element are preferably not bonded to each other.

The term "bonded" means bonded in substantially the entire interface of the bonded elements, i.e. a fully face to face bonding.

As mentioned above, the foundation layer is preferably a fluid permeable foundation layer in order to reduce the risk of forming gas pockets between the foundation layer and the innermost sealing sheath.

Usually gas will permeate from the bore of the pipe and through the innermost sealing sheath. This permeation through the innermost sealing sheath is usually relatively slow, however, over time a substantial amount of gas can permeate through the innermost sealing sheath. The bore is defined by the innermost sealing sheath. Often the unbonded flexible pipe will also comprise an armor layer in the form of a carcass inside the innermost sealing sheath. Such carcass is usually fluid permeable.

If the foundation layer should preferably be at least as gas permeable as the innermost sealing sheath. The gas permeability can be provided by gaps or by orifices. In an embodiment of the invention, the foundation layer comprises orifices for providing fluid permeability. By providing orifices for the gas to ensure sufficient fluid permeability a controlled gas path can simultaneously be provided such that the gas can be held in distance from sensitive materials and optionally can be guided out of the pipe. The foundation layer is preferably sufficiently fluid permeable to ensure that no pressure difference over the layer will be generated in use of the pipe. In an embodiment of the invention, the foundation layer is water permeable.

In a preferred embodiment of the invention, the foundation layer is fluid permeable, the fluid permeability is provided by gaps and/or orifices in the foundation layer. The total area provided by gaps and/or orifices in the foundation layer is preferably at least about 0.1 $cm^2$ per length meter of the pipe, such as preferably at least about 1 $cm^2$ per length meter of the pipe, preferably at least about 5 $cm^2$ per length meter of the pipe, preferably at least about 10 $cm^2$ per length meter of the pipe. The total area provided by gaps and/or orifices is determined when the pipe is in a straight and unloaded condition.

In principle the foundation layer can have any thickness provided that it is sufficient to enable the foundation layer to have the desired groove depth. Also it should be considered that the thickness may influence the flexibility of the resulting pipe, depending on the structure of the foundation layer.

In an embodiment of the invention, the foundation layer has a first thickness in the helically shaped groove(s) and a second thickness adjacent to the helically shaped groove(s), wherein the first thickness is from about 0.5 mm to about 50 mm, such as from about 1 mm to about 20 mm, such as from about 2 mm to about 5 mm.

In an embodiment of the invention, the second thickness of the foundation layer is from about 3 mm to about 75 mm, such as from about 5 mm to about 50 mm, such as from about 10 mm to about 25 mm.

In an embodiment of the invention, the helically shaped groove(s) has a depth which is the difference between the first and the second thickness, the depth is preferably from about 2.5 mm to about 25 mm, such as from about 4 mm to about 15 mm, such as from about 5 mm to about 19 mm.

In an embodiment of the invention, the elongate armor element(s) applied in the helically shaped groove(s) is/are in form of metal elongate armor element(s). The metal elongate armor element is for example of steel, aluminium or a combination. The metal elongate armor element could additionally comprise a sacrificial anode material e.g. zinc.

In an embodiment of the invention, the elongate armor element(s) applied in the helically shaped groove(s) is/are in form of composite elongate armor element(s).

In an embodiment the helically shaped groove(s) comprise(s) a metal liner to protect the elongate armor element(s) applied in the helically shaped groove(s) against corrosive gasses from the bore. These gasses can advantageously be guided out of the pipe via gas path between helically shaped grooves.

According to the invention it has been found that the pressure armor layer can be provided by composite elongate armor element(s) which is/are supported in the foundation layer. Due to the construction provided by the present invention the elongate armor element windings need not be interlocked and simultaneously the foundation layer protects the elongate armor element against wear. These effects together ensure that the pressure armor can be composed from composite elongate armor element(s).

This embodiment comprising elongate armor element(s) in the form of composite elongate armor element(s) has been found to be highly beneficial for pipes where low weight is an issue.

In an embodiment of the invention the unbonded flexible pipe is constricted such that the pressure armor layer comprises both elongate armor element(s) of metal and elongate armor element(s) of composite material. In an embodiment of the invention, the unbonded flexible pipe has two or more length sections which differ from each other in that the elongate armor element(s) is/are of different material. For example the unbonded flexible pipe can have one length section where the elongate armor element(s) is/are mainly or totally of metal and another length section where the elongate armor element(s) is/are mainly or totally of composite material. Thereby different sections of the unbonded flexible pipe can have different weight while simultaneously having a sufficiently high strength.

In an embodiment of the invention the unbonded flexible pipe is constricted such that the pressure armor layer at least in a length section of the pipe comprises two or more elongate armor element windings in a helically shaped groove of the foundation layer. In an embodiment, the unbonded flexible pipe has two or more length sections which differ from each other in that the number of elongate armor element windings in a helically shaped groove of the foundation layer differs from one length section to another of the length sections of the pipe.

In an embodiment, the unbonded flexible pipe has two or more length sections which differ from each other in that the strength of the elongate armor element windings in a helically shaped groove of the foundation layer differs from one length section to another of the length sections of the pipe. The strength may e.g. vary by varying the thickness of the elongate armor element providing the elongate armor element windings.

Preferably the composite elongate armor element(s) is/are in the form of fibre reinforced polymer strips. In an embodiment of the invention, the elongate armor element(s) applied in the helically shaped groove(s) is/are in the form of superimposed elongate armor strips, which are optionally bonded to each other e.g. by a thermoplastic material or another type of adhesive material.

The elongate armor strips preferably comprise composite elongate armor strips and preferably comprise fibres embedded in a polymer matrix.

The elongate armor strips are for example flat rectangular tapes; polygonal e.g. with one or more rounded corners, or they are basically round or hexagonal and are for example arranged in a twisted manner inside the channel.

In an embodiment of the invention, the elongate armor strips are in the form of superimposed elongate armor tapes.

In the following the term 'tapes' should be taken to mean substantially flat tapes, where the term "substantially" is used to include minor variations that are within the ordinary production tolerances.

The elongate armor strips can for example be as the strips described in U.S. Pat. No. 6,165,586, in WO 01/51839 and/or in U.S. Pat. No. 7,842,149.

The composite elongate armor strips comprise fibres embedded in an at least partly cured polymer matrix, preferably the polymer matrix is at least about 50% cured, such as at least about 70% cured, such as at least about 80% cured, such as at least about 90% cured, such as substantially fully cured.

In an embodiment of the invention, the composite elongate armor strips comprise fibres selected from basalt fibers, polypropylene fibers, carbon fibers, glass fibers, aramid fibers, steel fibers, polyethylene fibers, mineral fibers and/or mixtures comprising at least one of the foregoing fibers.

Generally fibres have a low weight relative to their strength and even though the tensile strength of the elongate support element is relatively low, the resulting tensile strength of the reinforcement element can be very high.

Preferably the fibres of the fibre reinforced composite elongate armor strips comprise or consist of basalt fibres.

The composite elongate armor strips has a longitudinal direction along their length, the predominant amount by weight of the fibres are preferably orientated in the longitudinal direction of the composite elongate armor strips in order to obtain a high strength. Preferably at least about 60% by weight, such as at least about 70% by weight, such as at least about 80% by weight, such as at least about 90% by weight, such as substantially all of the fibres are orientated in the longitudinal direction of the composite elongate armor strips.

In an embodiment of the invention, the fibers comprise one or more cut fibers and/or filaments, preferably strands comprising at least one of the foregoing, yarns comprising at least one of the foregoing, rovings comprising at least one of the foregoing and/or fibre bundles comprising at least one of the foregoing, the fibers preferably comprise a fibre bundle comprising spun, knitted, woven, braided fibers and/or are in the form of a regular or irregular network of fibers and/or a fibre bundle cut from one or more of the foregoing.

In a preferred embodiment of the invention, the major amount, preferably at least about 60% by weight of the fibers are in the form of continuous fibers, such as continuous filaments, continuous yarns, continuous rovings or combinations thereof.

In an embodiment, the polymer matrix of the composite elongate armor strips comprises a thermoset polymer, preferably selected from epoxy resins, vinyl-epoxy-ester resins, polyester resins, polyimide resins, bis-maleimide resins, cyanate ester resins, vinyl resins, benzoxazine resins, benzocyclobutene resins, or mixtures comprising at least one of the forgoing thermoset polymers.

In an embodiment, the polymer matrix of the composite elongate armor strips comprises a thermoplastic polymer, such as polyolefin, polyamide, polyimide, polyamide-imide, polyester, polyurethane, polyacrylate or mixtures comprising at least one of the forgoing thermoplastic polymers.

The elongate armor strips may for example be wound with intermediate non-armoring strips, such as strips of thermoplastic polymer, the thermoplastic polymer is optionally a cross-linkable polymer. Upon heating such thermoplastic strips the elongate armor strips can be bonded to each other.

In an embodiment of the invention, the method comprises providing that the elongate armor element(s) is/are applied in the helically shaped groove(s) such that the groove(s) is/are partly filled, such as from about 10% filled to fully filled.

In the embodiment where the foundation layer is applied after the elongate armor element i.e. the foundation layer is arranged outside the elongate armor element, it is desired that the elongate armor element(s) is contained fully in the groove(s) in order to reduce the risk of creeping of the innermost sealing sheath into gaps between windings of the elongate armor element(s).

The terms "inside" and "outside" a layer of the pipe is used to designate the relative distance to the axis of the pipe, such that "inside a layer" means the area encircled by the layer i.e. with a shorter axial distance than the layer, and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

In the embodiment where the foundation layer is applied prior to the elongate armor element i.e. the foundation layer is arranged inside the elongate armor element, it is desired that the groove(s) is/are substantially filled with elongate armor element(s) and optionally distance element in order to provide a relatively smooth surface for the layer on the outer side of the elongate armor element. Alternatively a holding element can be applied as described above.

In an embodiment of the invention, the method comprises applying the elongate armor element in the helically shaped groove(s), such that the groove is/are at least fully filled, e.g. such that the elongate armor element(s) extend(s) up to about 90% above the groove(s).

The method of the invention preferably comprises application of additional layer or layers. In an embodiment of the invention, the method comprises applying additional comprising at least one or more tensile armor layers;
one or more anti-wear layers;
one or more insulation layers;
one or more intermediate liquid impermeable layers or an outer (sealing) sheath.

Such layers are well known in the art e.g. as described in the introduction and/or the reference mentioned above and will not be described any further.

The invention also comprises an unbonded flexible pipe comprising
an innermost sealing sheath defining a bore and a longitudinal axis, around the inner sealing sheath;
a pressure armor layer and
a foundation layer for the non-interlocked pressure armor layer.

The unbonded flexible pipe of the invention is preferably obtainable by the method of the invention as described above.

The non-interlocked pressure armor layer comprises at least one helically wound elongate armor element with a width. The foundation layer is provided with at least one helically shaped groove, into which the elongate armor element(s) is/are applied preferably such that the elongate armor element(s), when the pipe is in an unloaded condition is/are not held in tension by the groove(s) of the foundation layer.

In a preferred embodiment of the invention, the helically shaped groove cross sectional width is larger than the width of the reinforcing element applied in the groove.

In an embodiment the foundation layer is applied in direct contact with the innermost sealing sheath or preferably with an anti-wear layer between the foundation layer and the innermost sealing sheath In an embodiment of the invention the elongate armor element(s) is outside the foundation layer.

In an embodiment of the invention the elongate armor element(s) is inside the foundation layer.

These and other embodiments of the unbonded flexible pipe are for example as described above.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the invention including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which.

The cross-sectional view is seen in a cut perpendicular to the winding angle of the elongated armor element.

Figure 5:
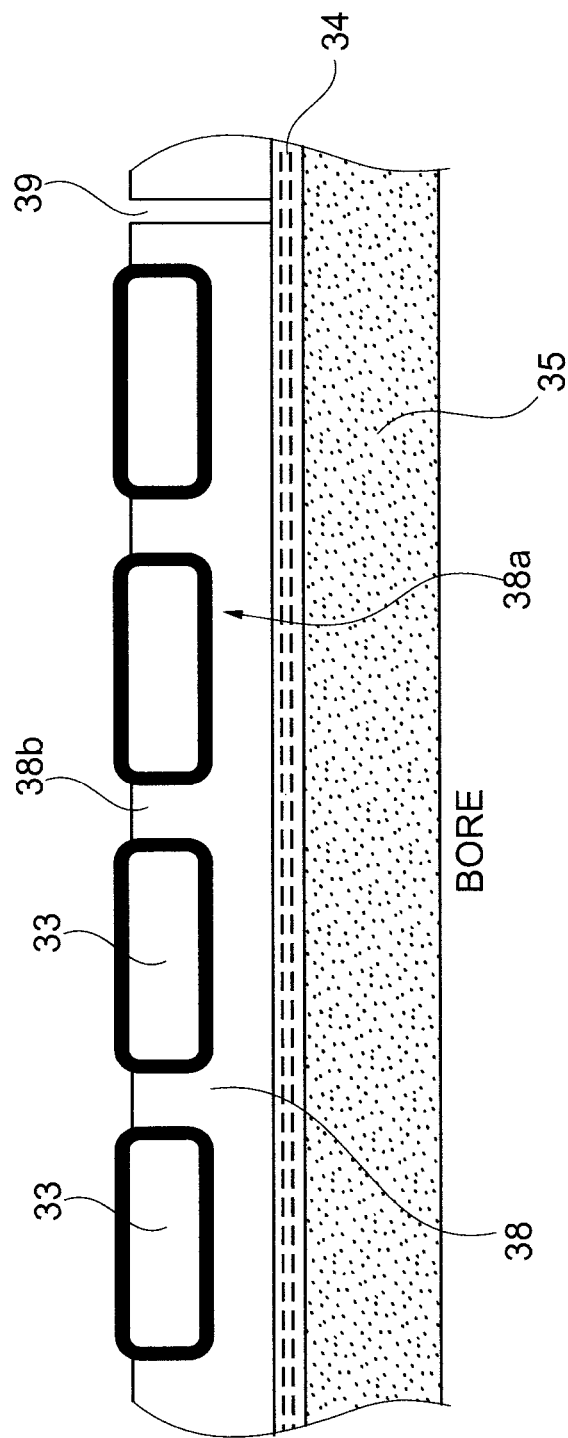

FIG. 5 is a cross-sectional view of a wall section of an unbonded flexible pipe of the invention comprising the elongate armor element helically wound into the helically shaped groove of the foundation layer.

Figure 6:
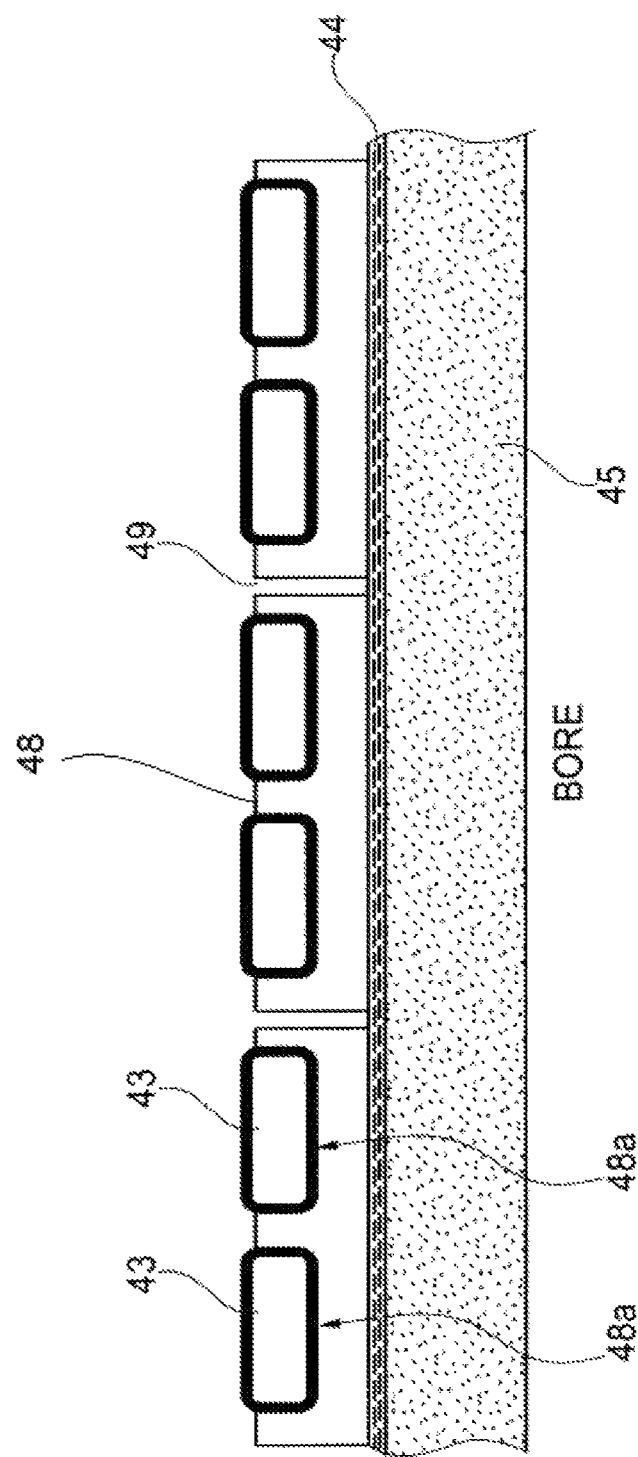

FIG. 6 is a cross-sectional view of a wall section of an unbonded flexible pipe of the invention comprising the elongate armor element helically wound into the helically shaped groove of a wound foundation layer.

Figure 7:
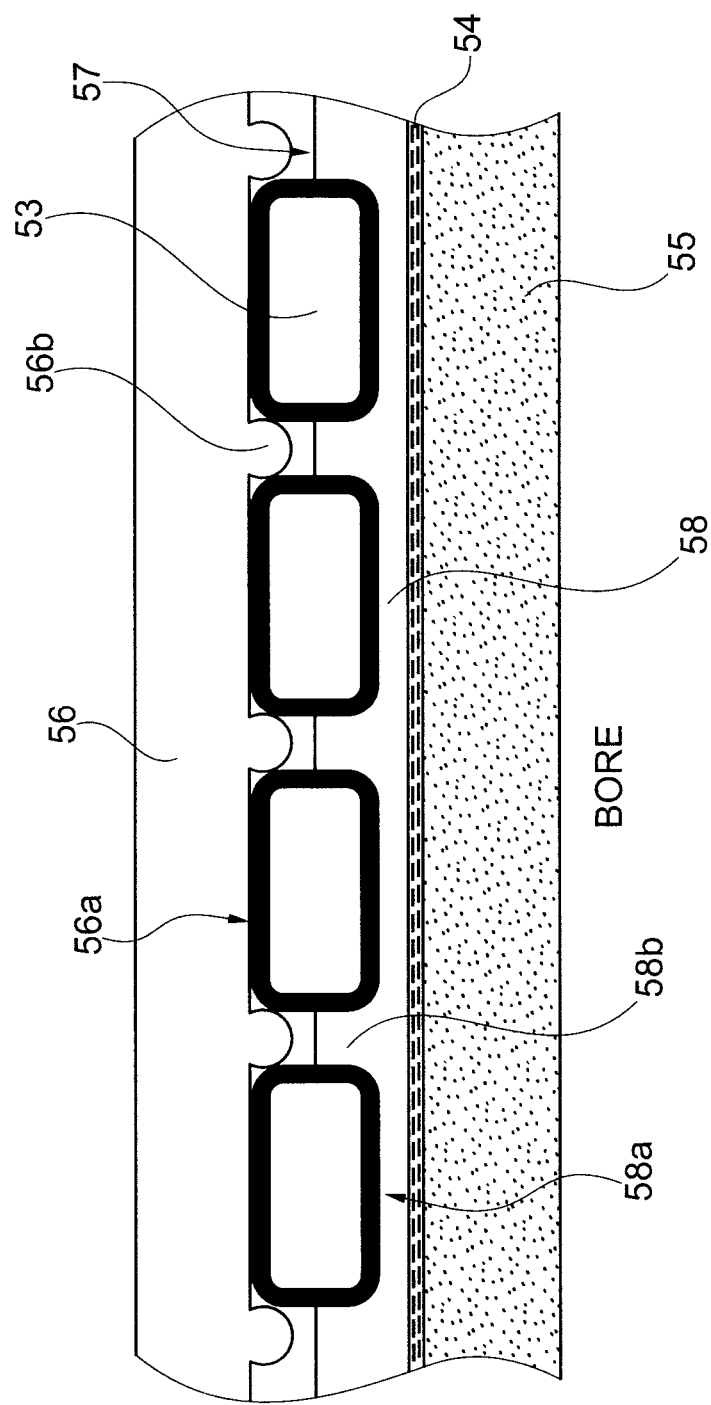

FIG. 7 is a cross-sectional view of a wall section of an unbonded flexible pipe of the invention comprising the elongate armor element helically wound into the helically shaped groove of the foundation layer and further comprising a holding layer.

Figure 8:
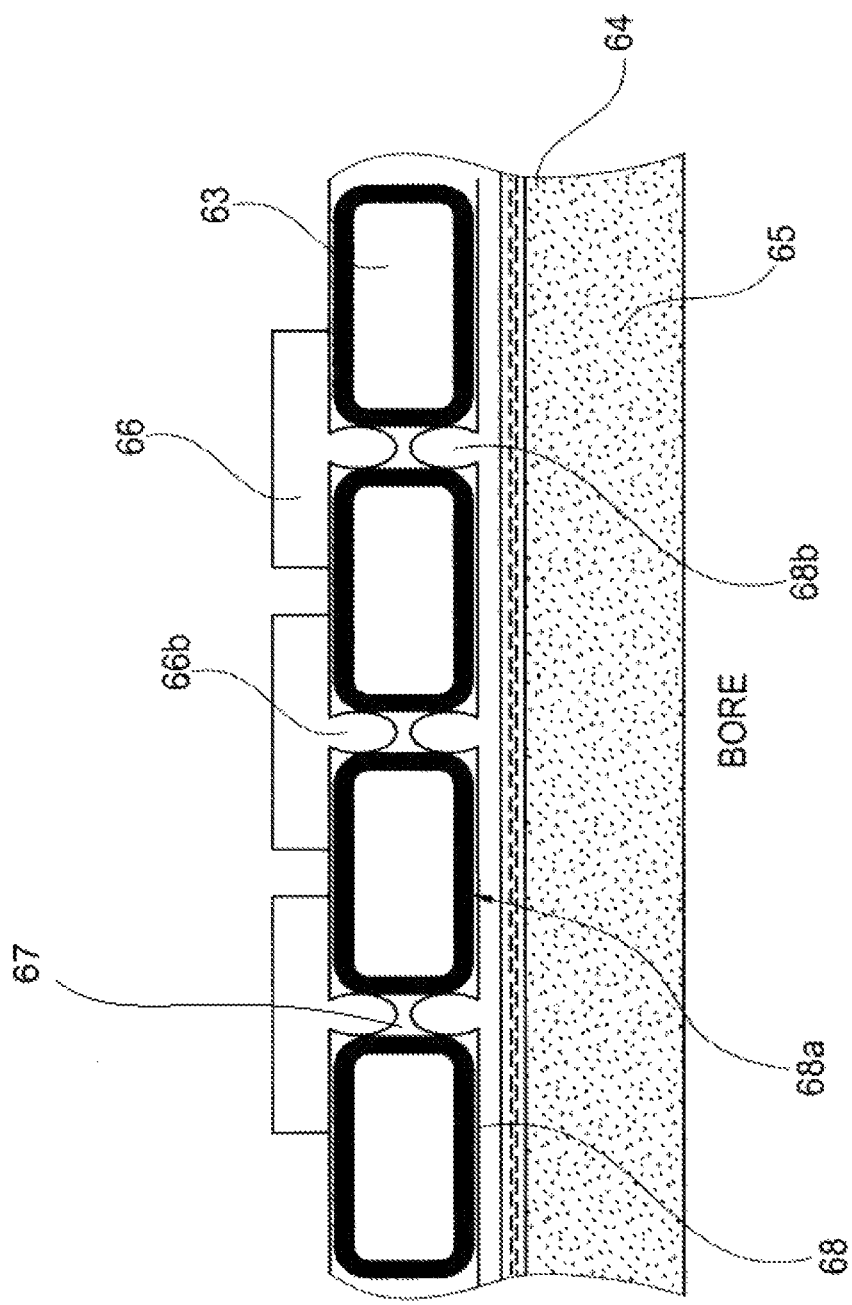

FIG. 8 is a cross-sectional view of a wall section of an unbonded flexible pipe of the invention comprising the elongate armor element helically wound into the helically shaped groove of the foundation layer and further comprising a wound holding layer.

Figure 9:
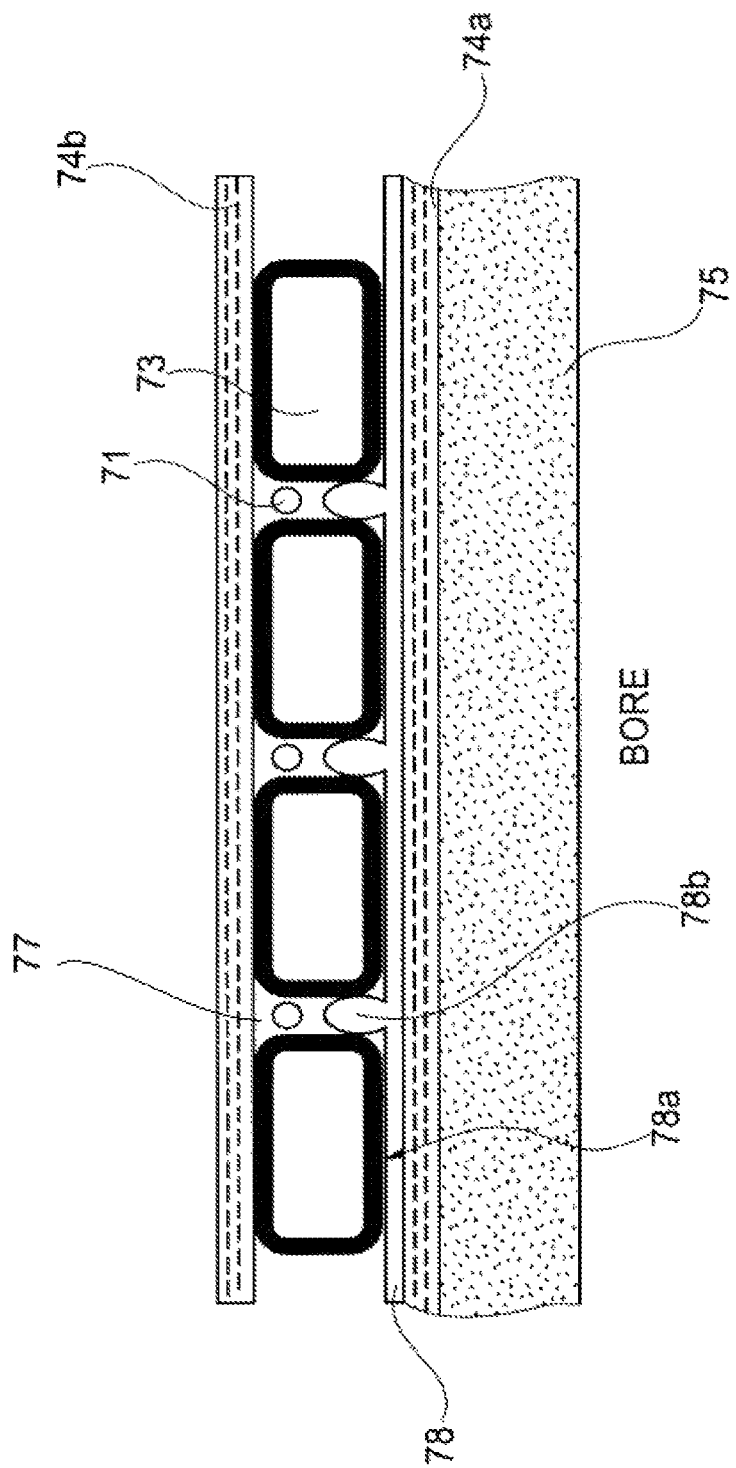

FIG. 9 is a cross-sectional view of a wall section of an unbonded flexible pipe of the invention comprising the elongate armor element helically wound into the helically shaped groove of the foundation layer and further comprising a distance element in the helically armor element gap.

Figure 10:
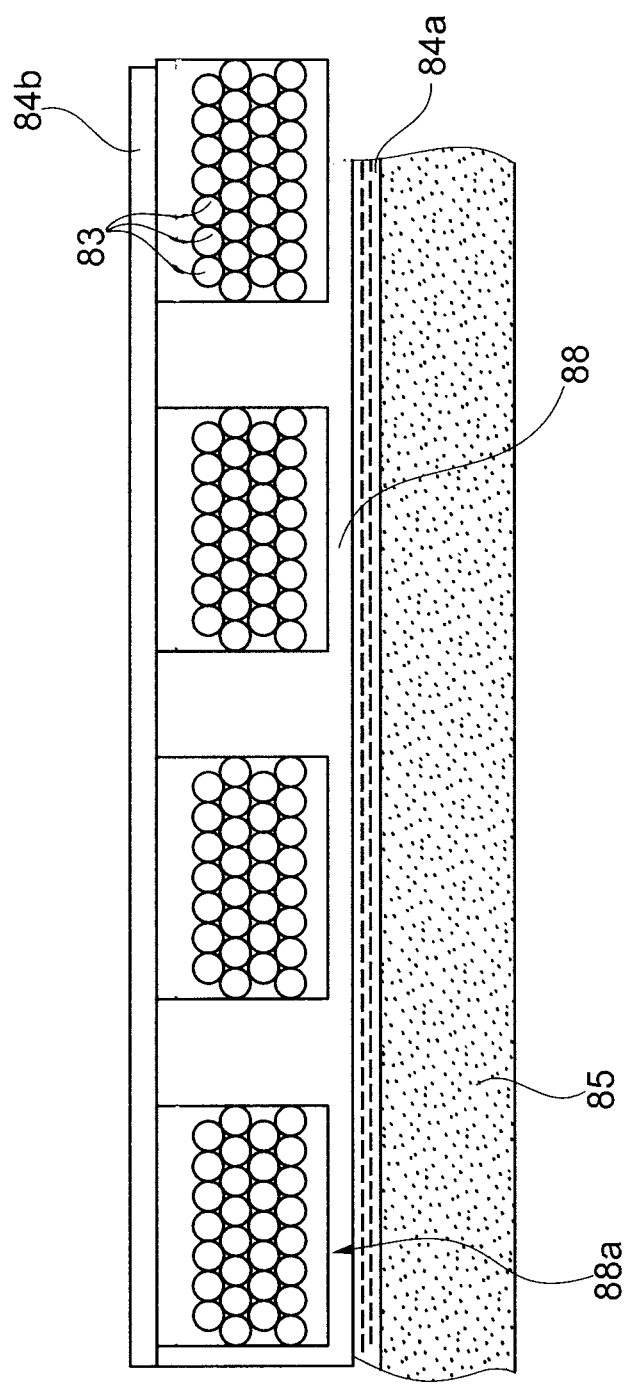

FIG. 10 is a cross-sectional view of a wall section of an unbonded flexible pipe of the invention comprising a plurality of elongate armor elements helically wound into the helically shaped groove of the foundation layer.

Figure 11:
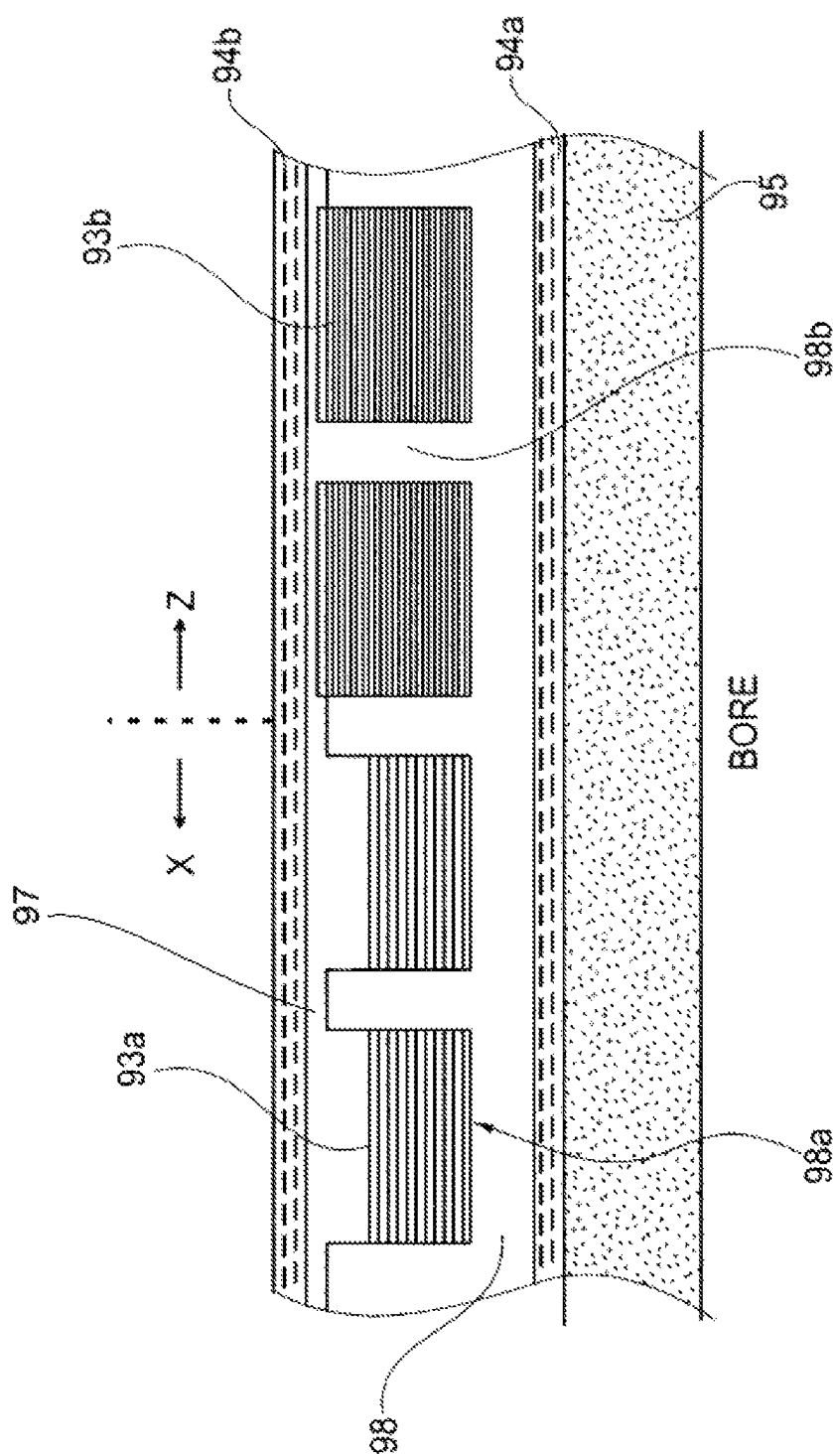

FIG. 11 is a cross-sectional view of a wall section of an unbonded flexible pipe of the invention comprising a first and a second pipe length section with a plurality of elongate armor elements helically wound into the helically shaped groove of the foundation layer where the number of elongate armor element windings in the first pipe length section differs from the number of elongate armor element windings in the second pipe length section.

Figure 12:
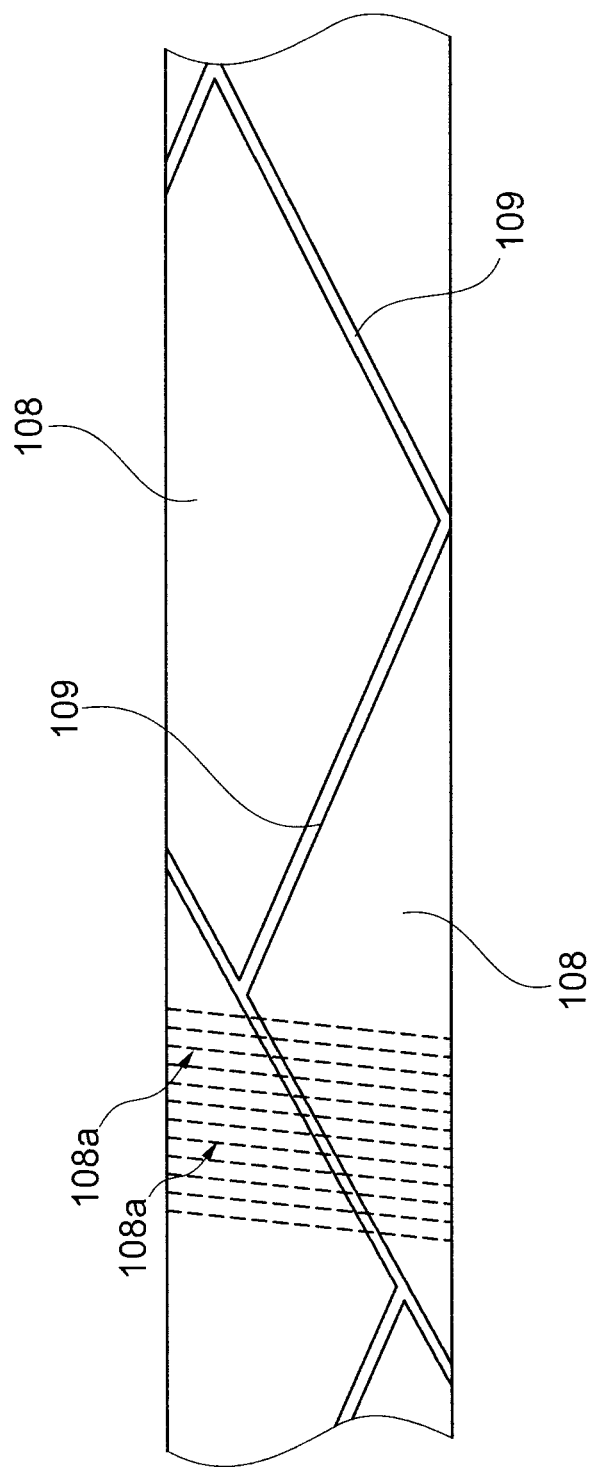

FIG. 12 is a side view of a partly produced unbonded flexible pipe of the invention prior to application of the pressure armor layer onto the foundation layer is applied in form of panel sections.

Figure 13:
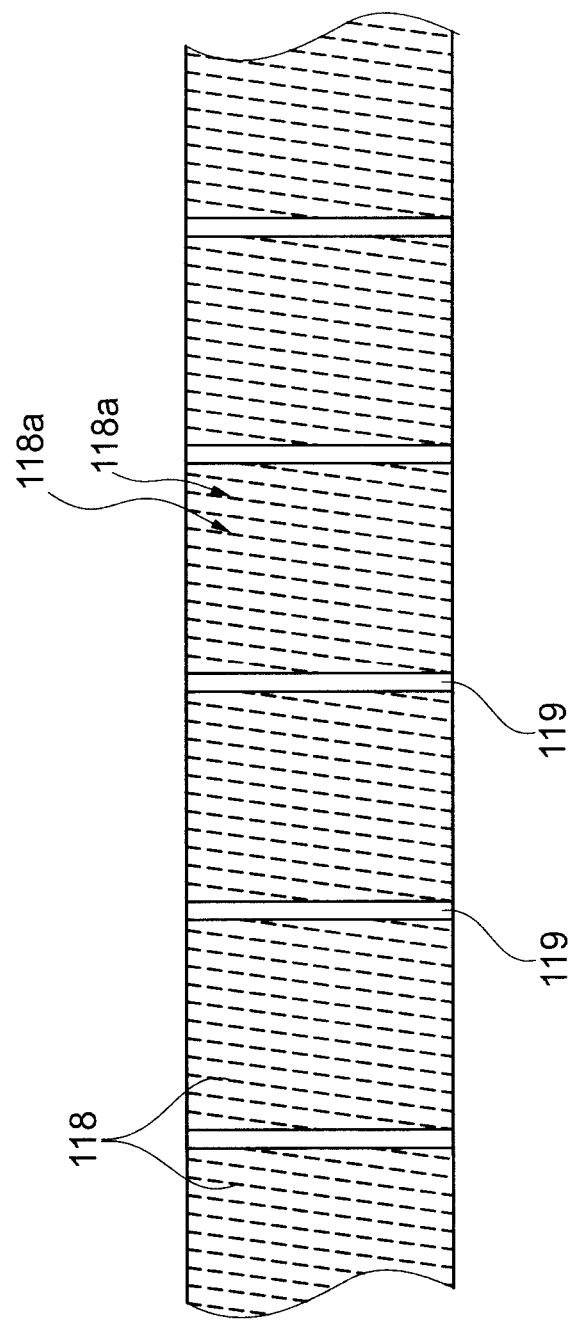

FIG. 13 is a side view of a partly produced unbonded flexible pipe of the invention prior to application of the pressure armor layer onto the foundation layer is applied in form of panel sections folded onto the pipe.

The figures are schematic and simplified for clarity, and they show only details which are essential to the understanding of the invention, while other details are left out. Throughout, the same reference numerals are used for identical or corresponding parts.

Figure 1:
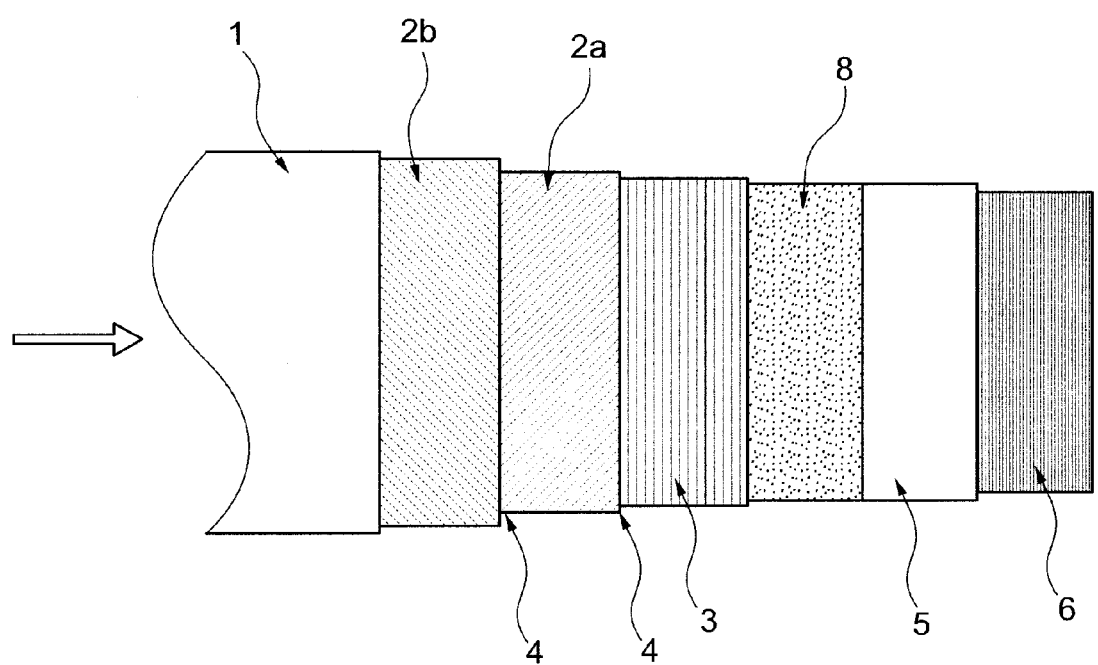
FIG. 1 is a schematic side view of a flexible armored pipe of the invention.

The flexible pipe shown in FIG. 1 comprises an innermost sealing sheath 5, often also called an inner liner, e.g. of high density poly ethylene (HDPE), cross linked polyethylene (PEX), Polyvinyldifluorid (PVDF) or polyamide (PA). The innermost sealing sheath has the purpose of preventing outflow of the fluid transferred in the bore of the pipe, indicated with the arrow. Inside the innermost sealing sheath 5 the pipe comprises an inner armor layer 6, called a carcass which is normally of metal, and has the main purpose of reinforcing the pipe against collapse as described above. The unbonded flexible pipe of the invention can also be provided without a carcass as described above. However, generally it is preferred that the unbonded flexible pipe of the invention comprises a carcass. The carcass 6 is not liquid tight.

On the outer side of the innermost sealing sheath 5, the flexible pipe comprises a foundation layer 8, which is as described above and a pressure armor layer 3, comprising helically wound armor element(s) of metal or composite material or combinations, which is wound with an angle to the axis of the pipe of about 65 degrees or more e.g. about 85 degrees. The pressure armor layer 3 is not liquid tight. The pressure armor layer 3 is applied onto the foundation layer 8.

Outside the pressure armor layer 3, the pipe comprises two cross wound tensile armor layers 2a, 2b wound from elongate armor elements. The elongate armor elements on the innermost tensile armor layer 2a are wound with a winding degree of about 55 degrees or less to the axis of the pipe in a first winding direction and the outermost tensile armor layer 2b is wound with a winding degree of about 60 degrees or less, such as between about 20 and about 55 degrees to the axis of the pipe in a second winding direction, which is the opposite direction to the first winding direction. The two armor layers with such opposite winding directions are normally referred to as being cross wound. The pipe further comprises an outer sealing sheath 1 protecting the armor layer mechanically and against ingress of sea water. As indicated with the reference number 4, the unbonded flexible pipe preferably comprises anti-friction layers between the armor layers 3, 2a, 2b. The anti-friction layers are usually not liquid tight and may for example be in the form of a wound film.

The terms 'anti-wear' and 'anti-friction' are herein used interchangeably.

Figure 2:
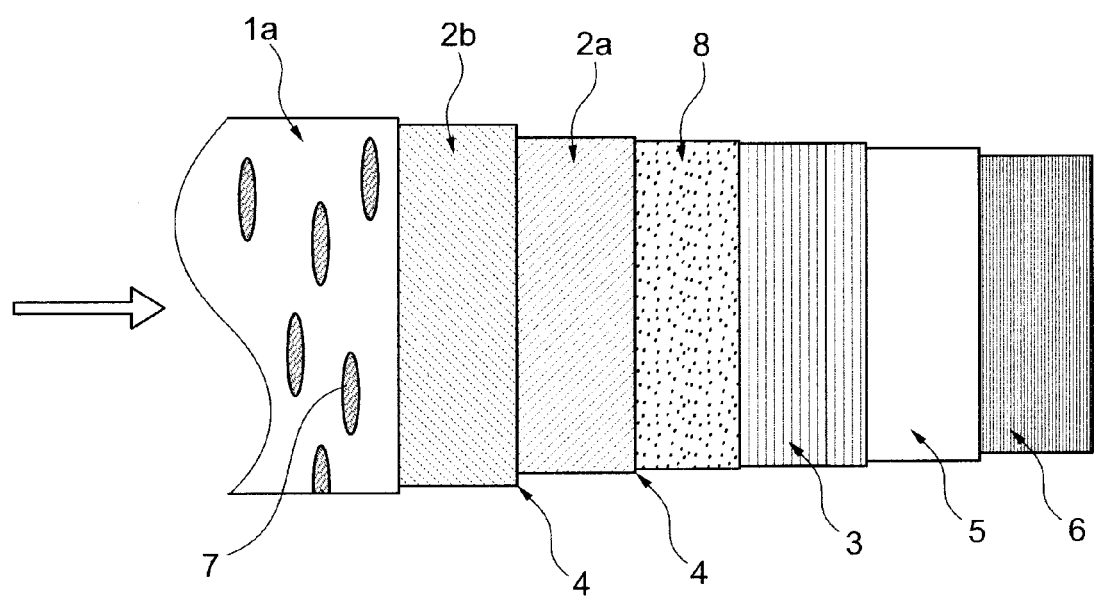
FIG. 2 is a schematic side view of a variation of the flexible armored pipe shown in FIG. 1.

FIG. 2 shows a variation of the flexible armored pipe shown in FIG. 1 where the foundation layer 8 is applied onto the pressure armor layer 3, and where the outer sealing sheath 1 has been replaced with an outer perforated and non-liquid tight mechanical protective outer sheath.

The pipe of the invention may have more or less layers than the pipes of FIGS. 1 and 2, and some layers may be replaced by other layers provided that the pipe comprises the pressure armor layer 3 and a foundation layer 8 for the pressure armor layer 3. For example the pipe may comprise additional polymer layer or layers—often called intermediate sealing sheath. Such additional polymer layer or layers may be applied between the respective armor layers. For example the pipe may comprise insulating layer or layers e.g. applied between the outermost tensile armor layer and the outer sheath. The type of layers and order of layers may e.g. be as described in documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and/or WO 2008077409, as well as in Specification for Unbonded Flexible Pipe, API, 17J, Third edition, July 2008 and/or in Recommended Practice for Flexible Pipe, API, 17B, Fourth edition, July 2008, provided that at least one armor layer is a displacement reduced armor layer as described herein.

Figure 3:
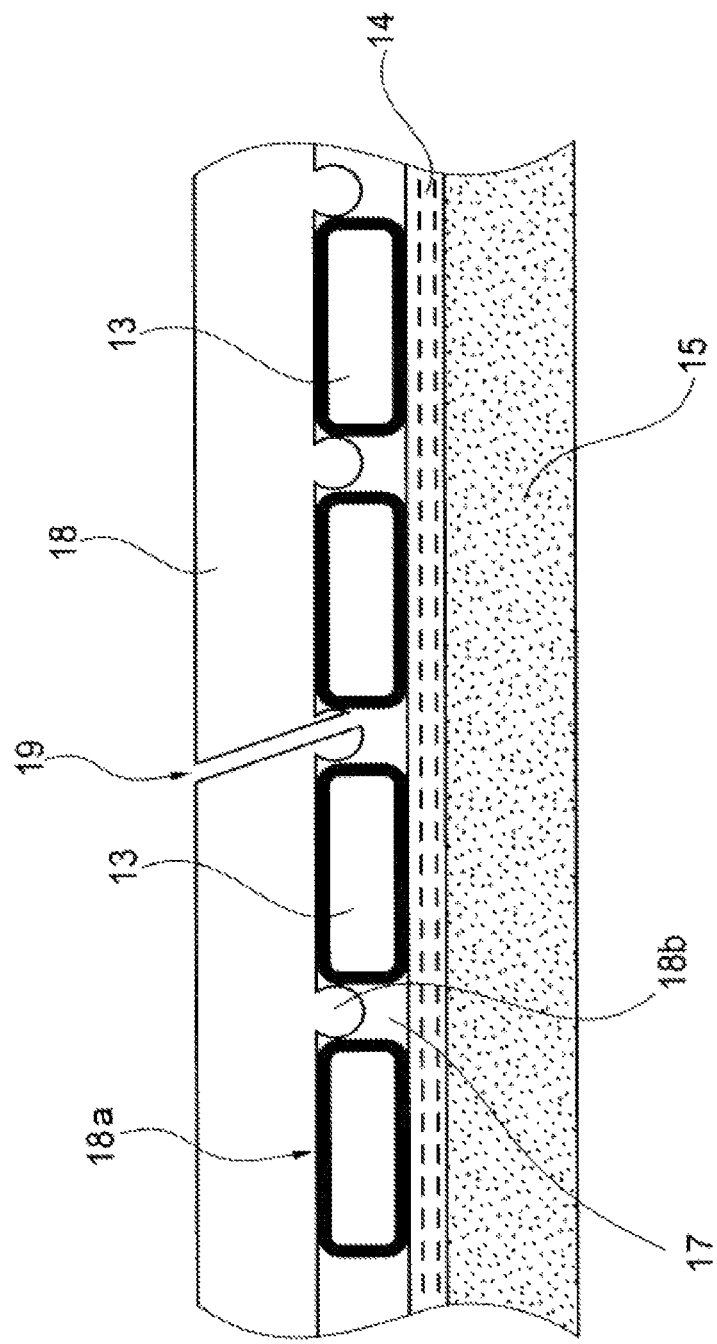
FIG. 3 is a cross-sectional view of a wall section of an unbonded flexible pipe of the invention comprising a foundation layer directly onto the elongate armor element. The cross-sectional view is seen in a cut perpendicular to the winding angle of the elongated armor element.

FIG. 3 shows a wall section of an unbonded flexible pipe of the invention comprising a foundation layer 18 directly onto the windings 13 of the elongate armor element.

The unbonded flexible pipe comprises an inner sealing sheath 15 defining a bore. An anti-wear layer 14 is applied onto the innermost sealing sheath 15. The anti-wear layer 14 has a high gas permeability and is for example in the form of a wound layer of woven PA. At least one helically wound elongate armor element 13 is applied onto the anti-wear layer 14 to form elongate armor element windings 13 with a helical armor element gap 17 between the elongate armor element windings 13.

A foundation layer 18 with at least one helically shaped groove 18a is applied onto the elongate armor element windings 13 such that the elongate armor element windings 13 are applied in the helically shaped groove 18a of the foundation layer 18. The foundation layer 18 at least partly fills the helically armor element gap 17 with a bud shaped wall section 18b of the foundation layer 18. The foundation layer 18 comprise orifices 19 for reducing the risk of forming gas pockets between the foundation layer 18 and the innermost sealing sheath 15. Fluid permeating from the bore and through the inner sealing sheath 15 can permeate through the anti-wear layer 14 and out through the orifices 19 of the foundation layer 18.

The pipe further comprises a not shown carcass in its bore on the inner side of the innermost sealing sheath 15.

Figure 4:
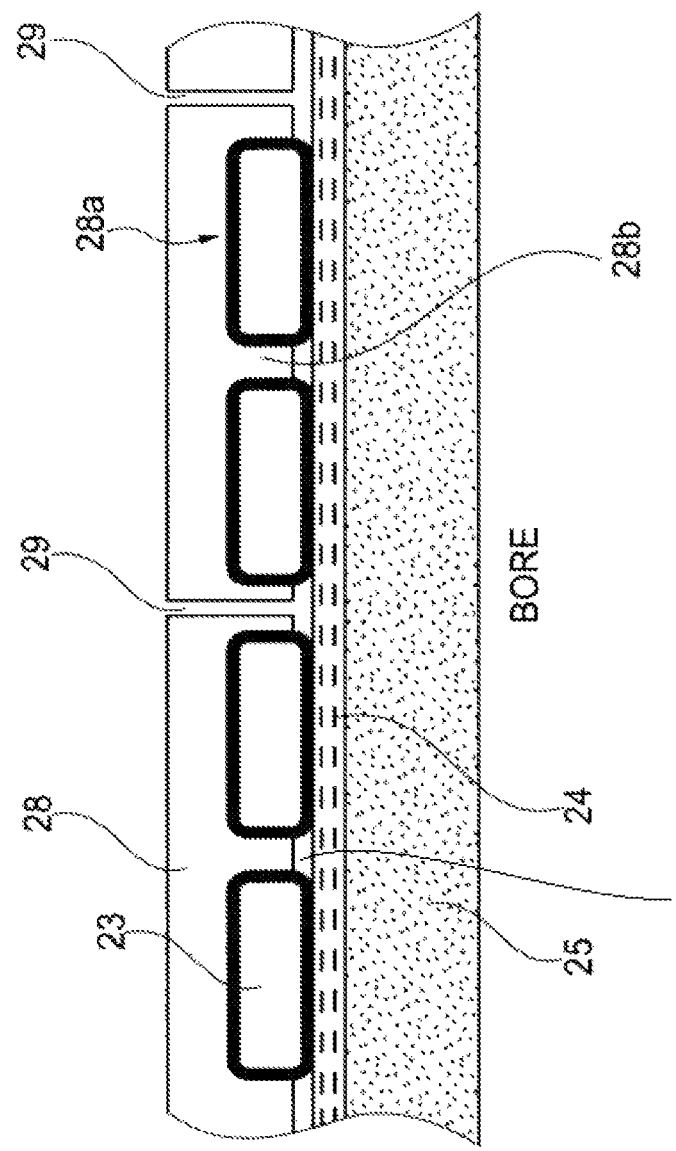
FIG. 4 is a cross-sectional view of a wall section of another unbonded flexible pipe of the invention comprising a foundation layer directly onto the elongate armor element.

FIG. 4 shows a wall section of another unbonded flexible pipe of the invention comprising a foundation layer 28 directly onto the windings 23 of the elongate armor element.

The unbonded flexible pipe comprises an innermost sealing sheath 25 defining a bore. An anti-wear layer 24 is applied onto the innermost sealing sheath 25. The anti-wear layer 24 has high gas permeability and is for example in form of a wound layer of woven PA. At least one helically wound elongate armor element 23 is applied onto the anti-wear layer 24 to form elongate armor element windings 13 with a helically armor element gap 27 between the elongate armor element windings 23.

A foundation layer 28 with at least one helically shaped groove 28a is applied onto the elongate armor element windings 23 such that the elongate armor element windings 23 are applied in the helically shaped groove 28a of the foundation layer 28. The foundation layer 28 at least partly fills the helically armor element gap 27 with an angular shaped wall section 28b of the foundation layer 28. The foundation layer 28 comprises orifices 29 for reducing the risk of forming gas pockets between the foundation layer 28 and the innermost sealing sheath 25. Fluid permeating from the bore and through the innermost sealing sheath 25 can permeate through the anti-wear layer 24 and out through the orifices 29 of the foundation layer 28.

FIG. 5 shows a wall section of an unbonded flexible pipe of the invention comprising the elongate armor element 33 helically wound into the helically shaped groove 38a of the foundation layer 38.

The unbonded flexible pipe comprises an innermost sealing sheath 35 defining a bore. An anti-wear layer 34 is applied onto the innermost sealing sheath 35. A foundation layer 38 with at least one helically shaped groove 38a is applied onto the anti-wear layer 34 and at least one helically wound elongate armor element 33 is applied into the helically shaped groove 38a of the foundation layer 38, to thereby form elongate armor element windings 33 with a helical armor element gap between the elongate armor element windings 33.

The foundation layer 38 fills the helical armor element gap with an angular shaped wall section 38b of the foundation layer 38. The foundation layer 38 comprises orifices 39 for reducing the risk of forming gas pockets between the foundation layer 38 and the innermost sealing sheath 35.

FIG. 6 shows a wall section of an unbonded flexible pipe of the invention comprising the elongate armor element 43 helically wound into the helically shaped groove 48a of the foundation layer 48.

The unbonded flexible pipe comprises an innermost sealing sheath 45 defining a bore. An anti-wear layer 44 is applied onto the innermost sealing sheath 45. A foundation layer 48 with two helically shaped grooves 48a is applied onto the anti-wear layer 44. The foundation layer 48 is in the form of an elongate foundation element which is helically wound onto the anti-wear layer 44. At least one helically wound elongate armor element 43 is applied into each of the helically shaped grooves 48a of the foundation layer 48, to thereby form elongate armor element windings 43 with a helically armor element gap between the elongate armor element windings 43.

The foundation layer 48 fills the helical armor element gap with an angular shaped wall section 48b of the foundation layer 48. The foundation layer 48 comprises gaps 49 provided between the windings of the elongate foundation element for reducing the risk of forming gas pockets between the foundation layer 48 and the innermost sealing sheath 45

FIG. 7 shows a wall section of an unbonded flexible pipe of the invention comprising the elongate armor element 53 helically wound into the helically shaped groove 58a of the foundation layer 58 and further comprising a holding layer 56.

The unbonded flexible pipe comprises an innermost sealing sheath 55 defining a bore. An anti-wear layer 54 is applied onto the innermost sealing sheath 55. A foundation layer 58 with at least one helically shaped groove 58a is applied onto the anti-wear layer 54 and at least one helically wound elongate armor element 53 is applied into the helically shaped groove 58a of the foundation layer 58, to thereby form elongate armor element windings 53 with a helical armor element gap 57 between the elongate armor element windings 53.

The foundation layer 58 partly fills the helical armor element gap 57 with an angular-shaped wall section 58b of the foundation layer 58.

A holding layer 56 with at least one helically shaped groove 26a is applied onto the elongate armor element windings 53 such that the elongate armor element windings 53 are applied in the helically shaped groove 56a of the holding layer 56. The holding layer 56 partly fills the helical armor element gap 57 with a bud shaped wall section 56b such that the helical armor element gap 57 is partly filled by the angular-shaped wall section 58b of the foundation layer 58 and partly filled by the bud shaped wall section 56b of the holding layer 56.

FIG. 8 shows a wall section of an unbonded flexible pipe of the invention comprising the elongate armor element 63 helically wound into the helically shaped groove 68a of the foundation layer 68 and further comprising a wound holding layer 66.

The unbonded flexible pipe comprises an innermost sealing sheath 65 defining a bore. An anti-wear layer 64 is applied onto the innermost sealing sheath 65. A foundation layer 68 with at least one helically shaped groove 68a is applied onto the anti-wear layer 64 and at least one helically wound elongate armor element 63 is applied into the helically shaped groove 68a of the foundation layer 68, to thereby form elongate armor element windings 63 with a helical armor element gap 67 between the elongate armor element windings 63.

The foundation layer 68 partly fills the helical armor element gap 67 with an angular-shaped wall section 68b of the foundation layer 68.

A holding layer 66 with a T shape is wound onto the elongate armor element windings 63. The holding layer 66 is provided by winding of a T shaped elongate holding element such that the angular leg-part 66b of the T shaped elongate holding element partly fills the helical armor element gap 67.

The holding layer 66 partly fills the helical armor element gap 67 with an angular-shaped wall section 66b such that the helical armor element gap 67 is partly filled by the angular-shaped wall section 68b of the foundation layer 68 and partly filled by the angular-shaped wall section 66b of the holding layer 66.

FIG. 9 shows a wall section of an unbonded flexible pipe of the invention comprising the elongate armor element 73 helically wound into the helically shaped groove 78a of the foundation layer 78 and further comprising a distance element 71 in the helically armor element gap.

The unbonded flexible pipe comprises an innermost sealing sheath 75 defining a bore. An anti-wear layer 74a is applied onto the innermost sealing sheath 75. A foundation layer 78 with at least one helically shaped groove 78a is applied onto the anti-wear layer 74a and at least one helically wound elongate armor element 73 is applied into the helically shaped groove 78a of the foundation layer 78, to thereby form elongate armor element windings 73 with a helical armor element gap 77 between the elongate armor element windings 73.

The foundation layer 78 partly fills the helical armor element gap 77 with an angular-shaped wall section 78b of the foundation layer 78.

A distance element 71 is applied in the helical armor element gap above the angular-shaped wall section 78b of the foundation layer 78. A further anti-wear layer 74b is applied to provide a good surface for the next layer of the pipe, such as a tensile armor layer.

FIG. 10 shows a wall section of an unbonded flexible pipe of the invention comprising a plurality of elongate armor elements 83 helically wound into the helically shaped groove 88a of the foundation layer 88.

The unbonded flexible pipe comprises an innermost sealing sheath 85 defining a bore. An anti-wear layer 84a is applied onto the innermost sealing sheath 85. A foundation layer 88 with at least one helically shaped groove 88a is applied onto the anti-wear layer 84 and the plurality of elongate armor elements 83 are applied into the helically shaped groove 88a of the foundation layer 88, to thereby form elongate armor element windings 83.

The plurality of elongate armor elements 83 are metal wires or/and cords of fibres.

A further anti-wear layer 84b is applied to provide a good surface for the next layer of the pipe, such as a tensile armor layer.

FIG. 11 shows a wall section of an unbonded flexible pipe of the invention comprising a first pipe length section X and a second pipe length section Z.

The unbonded flexible pipe comprises an innermost sealing sheath 95 defining a bore. An anti-wear layer 94a is applied onto the innermost sealing sheath 95. A foundation layer 98 with is applied onto the anti-wear layer 94.

The plurality of elongate armor elements 93a, 93b are in the form of tape shaped elongate armor elements 93a, 93b and they are applied into the helically shaped groove 98a of the foundation layer 98, to thereby form stacks of elongate armor element windings 93a, 93b. A helical armor element gap 97 is arranged between stacks of elongate armor element windings 93a, 93b.

The number of elongate armor element windings 93a in the first pipe length section X differs from the number of elongate armor element windings 93b in the second pipe length section Z.

A further anti-wear layer 94b is applied to provide a good surface for the next layer of the pipe, such as a tensile armor layer.

FIG. 12 shows a partly produced unbonded flexible pipe of the invention prior to application of the pressure armor layer. The unbonded flexible pipe comprises a plurality of foundation panel sections 108 forming a foundation layer. The foundation panel sections 108 are applied with a gap 109 between them to ensure sufficient fluid permeability. The foundation panel sections 108 comprise groves, such than after application of the foundation panel sections 108 the foundation layer comprises at least one helically shaped groove 108a into which the elongate armor element(s) can be helically wound.

FIG. 13 shows a partly produced unbonded flexible pipe of the invention prior to application of the pressure armor layer. The unbonded flexible pipe comprises a plurality of foundation panel sections 118 forming a foundation layer. The panel sections 118 are in the form of tubular sections that can be folded onto the pipe. The foundation panel sections 108 are applied with gaps 119 between them to ensure sufficient fluid permeability. The foundation panel sections 118 comprise groves, such than after application of the foundation panel sections 118 the foundation layer comprises at least one helically shaped groove 118a into which the elongate armor element(s) can be helically wound.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

What is claimed is:

1. A method of producing an unbonded flexible pipe, the method comprises providing an innermost sealing sheath defining a bore and a longitudinal axis, and a pressure armor layer surrounding the innermost sealing sheath, the pressure armor layer comprises at least one helically wound elongate armor element with at least one helical armor element gap between windings thereof, wherein the method comprises providing a foundation layer for the pressure armor layer, the foundation layer is provided with at least one helically shaped groove, and providing that the elongate armor element is applied in the helically shaped groove such that the foundation layer at least partly fills the helical armor element gap.

2. The method of claim 1, wherein the foundation layer is a fluid permeable foundation layer.

3. The method of claim 1, wherein the elongate armor element is a non-interlocked elongate armor element.

4. The method of claim 1, wherein the method comprises helically winding the at least one elongate armor element followed by applying the foundation layer such that the elongate armor element is applied in the helically shaped groove.

5. The method of claim 4, wherein the method comprises applying an anti-wear layer onto the at least one helically wound elongate armor and/or between the at least one helically wound elongate armor element prior to applying the foundation layer.

6. The method of claim 4, wherein the method comprises applying at least one distance element in the helical armor element gap prior to applying the foundation layer, the at least one distance element being an elongate element with a cross-sectional width of from about 50% to about 100% of the average width of the helical armor element gap.

7. The method of claim 4, wherein the method comprises applying an anti-wear layer prior to helical winding of the at least one elongate armor element.

8. The method of claim 1, wherein the method comprises applying the foundation layer followed by helically winding the at least one elongate armor element, such that the elongate armor element is applied in the helically shaped groove and the elongate armor element is helically wound directly onto the foundation layer or the method comprises applying a flexible anti-wear layer onto the foundation layer prior to applying the elongate armor element.

9. The method of claim 8, wherein the method comprises applying a holding layer onto the elongate armor element, wherein the holding layer is in the form of at least one helically wound elongate holding element.

10. The method of claim 9, wherein the width of the elongate holding element is at least about the width of the elongate armor element.

11. The method of claim 10, wherein the width of the elongate holding element is such that upon the helically winding thereof the windings of the elongate holding element are in contact with adjacent windings thereof.

12. The method of claim 10, wherein the width of the elongate holding element is such that upon the helical winding thereof the windings of the elongate holding element form helically holding element gap between windings gap.

13. The method of claim 9, wherein the holding layer is in the form of an additional foundation layer, the additional foundation layer being substantially identical to the first applied foundation layer.

14. The method of claim 1, wherein the foundation layer is a polymer layer having a tensile strength which is less than the tensile strength of the elongate armor element in its elongate direction.

15. The method of any of claim 1, wherein the foundation layer is an extruded layer.

16. The method of any of claim 1, wherein the foundation layer is a wound layer, the foundation layer is provided by winding at least one elongate foundation element which elongate foundation element is pre-shaped such that upon winding, the elongate foundation element form the foundation layer with the at least one helically shaped groove.

17. The method of claim 16, wherein the elongate foundation element has a cross-sectional width which is larger than the cross-sectional width of the elongate armor element.

18. The method of claim 17, wherein the elongate foundation element is helically wound in an edge-to-edge configuration.

19. The method of claim 17, wherein the elongate foundation element is helically wound with an elongate foundation element gap.

20. The method of claim 1, wherein the foundation layer is applied in panel sections wherein each panel section surrounds at least about $\frac{1}{8}^{th}$ of the innermost sealing sheath.

21. The method of claim 1, wherein the foundation layer comprises orifices for allowing fluid permeability, the foundation layer is sufficiently fluid permeable to ensure that no pressure difference over the layer will be generated in use of the pipe, and the foundation layer is water permeable.

22. The method of claim 1, wherein the method comprises applying the elongate armor element in the helically shaped groove, such that the groove is at least fully filled, such that the elongate armor element extends up to about 90% above the groove.

23. The method of claim 1, wherein the method comprises applying additional layer(s) comprising at least one or more tensile armor layers;

one or more anti-wear layers;

one or more insulation layers;

one or more intermediate liquid impermeable layers or an outer (sealing) sheath.

* * * * *